United States Patent
Martin

(10) Patent No.: US 9,273,810 B1
(45) Date of Patent: Mar. 1, 2016

(54) METAL HOSE FITTING AND FLANGED INSERT THAT SAFELY CONDUCTS HIGH VELOCITY FLUIDS/GASES UP TO MACH 1

(75) Inventor: James Martin, Quartz Hill, CA (US)

(73) Assignee: Delafield Corporation, Duarte, CA (US)

( * ) Notice: Subject to any disclaimer, the term of this patent is extended or adjusted under 35 U.S.C. 154(b) by 422 days.

(21) Appl. No.: 13/396,200

(22) Filed: Feb. 14, 2012

(51) Int. Cl.
*F16L 33/01* (2006.01)

(52) U.S. Cl.
CPC ........................................ *F16L 33/01* (2013.01)

(58) Field of Classification Search
USPC ............................ 285/222.1–222.5, 239, 256, 285/288.1–288.5, 226, 903
See application file for complete search history.

(56) References Cited

U.S. PATENT DOCUMENTS

| | | | | |
|---|---|---|---|---|
| 2,420,153 A | * | 5/1947 | Sprenger et al. | 285/288.1 |
| 2,516,631 A | * | 7/1950 | Jacobson | 285/222.5 |
| 2,666,657 A | * | 1/1954 | Howard et al. | 285/288.11 |
| 2,867,242 A | * | 1/1959 | Harris et al. | 285/288.1 |
| 3,008,737 A | * | 11/1961 | Longfellow | 285/289.1 |
| 3,169,785 A | * | 2/1965 | Ziebold | 285/226 |
| 3,393,267 A | * | 7/1968 | Busse | 285/249 |
| 3,420,553 A | * | 1/1969 | Poxon et al. | 285/363 |
| 4,991,876 A | | 2/1991 | Mulvey | |
| 5,263,747 A | * | 11/1993 | Lefebvre et al. | 285/903 |
| 5,660,419 A | * | 8/1997 | Kim | 285/226 |
| 5,890,748 A | | 4/1999 | Phillips et al. | |
| 6,296,283 B1 | * | 10/2001 | Dietzel | 285/256 |
| 6,513,552 B1 | * | 2/2003 | Shepherd | 138/109 |
| 6,660,199 B2 | | 12/2003 | Siferd et al. | |
| 6,866,302 B2 | | 3/2005 | Furata | |
| 6,902,202 B2 | * | 6/2005 | Huber | 285/226 |
| 7,066,497 B2 | | 6/2006 | Fullbelck et al. | |
| 7,264,280 B2 | * | 9/2007 | Kim | 285/226 |
| 7,380,837 B2 | | 6/2008 | Fullbeck et al. | |
| 8,382,165 B2 | * | 2/2013 | Stalcup et al. | 285/226 |
| 8,844,579 B2 | * | 9/2014 | Eguchi et al. | 285/226 |
| 8,888,139 B2 | * | 11/2014 | Hunter | 285/903 |
| 2006/0192380 A1 | | 8/2006 | Fullbeck et al. | |

FOREIGN PATENT DOCUMENTS

| | | |
|---|---|---|
| CN | 201237036 Y | 5/2009 |
| DE | 20200709801 U1 | 12/2008 |
| GB | 575057 | 2/1944 |

* cited by examiner

*Primary Examiner* — David E Bochna
(74) *Attorney, Agent, or Firm* — Thomas I. Rozsa

(57) ABSTRACT

An apparatus to enable the flow of high speed gases through the apparatus, the apparatus including modifying a metal hose which can be a metal hose or a corrugated metal hose having an exterior braid and an interior liner. The improvement includes inserting a non-bendable flange insert into a leading edge of the metal pipe and combining that with a pipe having a tapered interior wall which is welded to the metal hose to facilitate the flow of gases to a level of Mach 1 without damaging the interior portions of the interior liner.

9 Claims, 4 Drawing Sheets

METAL HOSE FITTING AND FLANGED INSERT THAT SAFELY CONDUCTS HIGH VELOCITY FLUIDS/GASES UP TO MACH 1

BACKGROUND OF THE INVENTION

1. Field of the Invention

The present invention relates to field of metal hose designs which are subjected to high velocity gasses passing into and through the hose.

2. Description of the Prior Art

The following ten patents and published patent applications are relevant to the present invention:

1. U.S. Pat. No. 4,991,876 issued to Philip Mulvey on Feb. 12, 1991 for "Connector Assembly For Hot Water Heaters And Other Appliances" (hereafter the "Mulvey Patent");
2. U.S. Pat. No. 5,890,748 issued to Daniel Phillips et al. on Apr. 6, 1999 for "Composite Male Hose Coupler" (hereafter the "Phillips Patent");
3. U.S. Pat. No. 6,660,199 issued to Roger Lee Siferd et al. on Dec. 9, 2003 for "Pipe Structure And Method of Manufacture" (hereafter the "Siferd Patent");
4. U.S. Pat. No. 6,866,302 issued to Norihiko Furata on Mar. 15, 2005 for "Connecting Structure For Hose With Corrugated Metal Tube" (hereafter the "Furata Patent");
5. U.S. Pat. No. 7,066,497 issued to Wolfgang F. Fullbeck et al. on Jun. 27, 2006 for "Fitting For A Flexible Metal Hose" (hereafter the "'497 Fullbeck Patent");
6. United States Published Patent Application No. 2006/0192380 to Wolfgang F. Fullbeck et al. on Aug. 31, 2006 for "Fitting For A Flexible Metal Hose" (hereafter the "Fullbeck Published Patent Application");
7. U.S. Pat. No. 7,380,837 issued to Wolfgang F. Fullbeck et al. on Jun. 3, 2008 for "Fitting For A Sanitary Hose" (hereafter the "'837 Fullbeck Patent");
8. United Kingdom Patent No. 575,057 issued to Edward Chiffey on Feb. 24, 1944 for "Improvements In Or Relating To Couplings For Flexible Hose, Pipes, Tubes And the Like" (hereafter the "Chiffey Patent");
9. German Patent No. DE20200709801U1 issued to Witzenmann GmbH on Dec. 24, 2008 for "Arrangement for Fluid-Close Connecting Of Two Ends Of Pipe Made Of Different Metals" (hereafter the "Witzenmann Patent");
10. Chinese Patent No. CN201237036Y issued to Tao Lin on May 13, 2009 for "Thin-Wall Metal Connecting Pipe" (hereafter the "Lin Patent").

The Mulvey Patent deals with an improved connector which has a flexible braided metal hose assembly with a compression fitting or pipe fitting at one end and a special composite fitting assembly with an electric insulating insert in a metal male outer fitting at the other end for connection to the water line of an appliance such as a water heater. The relevance of this patent is that referring to FIG. 8, the tubular body 126 of the inner fitting (insert) 102 can comprise a tapered sleeve 128 as shown in FIG. 6 which can be sonically welded, glued, or press fit (FIG. 8) (snap fit) into the internal chamber 114. The inner fitting (insert) 102 can also include at least one frustoconical annular barb 130 (FIG. 8) which extends radially outwardly of the sleeve 126 to engage the internal female wall 114 providing the chamber or cavity of the outer fitting 100.

The Phillips Patent discloses:

"A composite male hose coupler comprising a metallic tail piece; an externally threaded male fitting; and means for affixing the tail piece to the male fitting; and a method of manufacture thereof, are disclosed. The metallic tail piece is formed of annealed brass tube stack and includes a first cylindrical portion and a second cylindrical portion joined together by a radially outwardly extending flange generally perpendicular to the longitudinal axes of the first and second cylindrical portions. The externally threaded male fitting is formed of machined brass stock and includes external threads on the outer surface and an annular lip for receiving the flange of the tail piece. A solder material is employed to produce a fluid-tight seal between the tail piece and the male fitting."

The Siferd Patent discloses:

"A pipe section formed of a polymeric material which has a substantially constant thickness throughout, the terminal edge of the female connection having a reinforcement structure which rigidifies the end of the female connection and prevents deformation, the pipe section preferably having a flared end, and the reinforcement structure preferably being a semicircular channel formed at the end of the pipe section by a mandrel after initial extrusion of the pipe section; along with a method and apparatus for forming the pipe section, a pipe assembly including such pipe section, and a method of forming the pipe assembly."

The Furata Patent discloses:

"In a hose with corrugated metal tube, a connecting pipe is formed with a tapered inner surface in a tip end portion thereof a corrugated metal tube is formed with a flared portion flaring as to correspond to the tapered inner surface of the connecting pipe, and a mating pipe is formed with a tapered outer surface. The hose with corrugated metal tube is connected to the mating pipe by a cap nut so that the tapered inner space of the connecting pipe abuts the tapered outer surface of the mating pipe with the flared portion therebetween."

The '497 Fullbeck Patent discloses:

"A flexible hose formed from corrugated metal tube has a fitting permanently crimped to the end of the hose. The fitting includes an elongated stem having a first end adapted to be coupled to an appropriate fitting surface and a second end configured to be received within the hose. A sealing member disposed on the second end of the stem seals the fitting between the corrugated metal tube and the stem. A ferrule is placed over the hose and is crimped to compress the hose and sealing member between the ferrule and stem."

The Fullbeck Published Patent Application is a continuation of the previously discussed patent and discloses a similar concept.

The '837 Fullbeck Patent is by the same inventor and is for a fitting for a sanitary hose. Referring to the patent text, Column 2, the patent states:

"FIGS. 2A and 2B show the hose assembly 10 in greater detail. The elongate, tubular stem 20 has a first end 26 adapted to mate with a corresponding fitting surface (not shown), such as the mounting flange of a machine, or a coupling for joining the hose assembly 10 to another hose or conduit. It will be recognized that the first end 26 of the stem 20 may be adapted to mate with any configuration of corresponding fitting surface, as may be desired, and the first end 26 is not limited to the particular configuration shown in the figures. A second end 28 of the stem 20 is sized and shaped to be received within the interior 30 of the sanitary hose 14. In use, an axial bore 25 through the stem 20 communicates with the interior 30 of the hose to allow movement of material from the hose 14 and through the fitting 12."

The British Patent to Chiffey is for improvements in or relating to couplings for flexible hose, pipes, tubes and the like.

The German Patent DE202007009801U1 is entirely in German but there is an English translation. The patent discloses:

"Arrangement for fluid-close connecting of two end of pipe (1, 2) made of different metals with different Warmeausdehnugskoeffizienten, in particular from high-grade steel and aluminum, comprehensively a first end of pipe (1) made of a first metal and a second end of pipe (2) made of a second metal, whereby the two ends of pipe (1, 2) for the education of an overlap range (3), as well as one in the overlap range (3) between the two ends of pipe (1,2) are into one another-put arranged layer from a Adhasivstoff (4), by the fact characterized that the ends of pipe (1, 2) is so into one another-put that they are against each other radially linked up with about 20° C."

The Canadian Patent for a thin wall metal connecting pipe discloses:

"The utility model discloses a thin-wall metal connection pipe, which comprises a thin-wall outer connection pipe and a thin-wall inner connection pipe. The thin-wall metal connection pipe is characterized in that the spigot of the outer connection pipe comprises a frustum port and a threaded transition interface. During connection, the threaded transition interface of the inner connection pipe; and the frustum port of the inner connection pipe is connected with the tapered transition interface of the outer connection pipe. By adopting the structure, the thin-wall connection pipe overcomes the disadvantages of the conventional thin-wall connection pipe, such as complex structure, high production cost and difficult processing, and can reduce the material consumption of the pipe joint and greatly reduces the cost of the connector on the premise of the ensured sealing reliability. The thin-wall metal connection pipe has the advantages of simple and convenient construction and processing, repeated assembly and disassembly, environmental protection, high durability, etc."

SUMMARY OF THE INVENTION

The present invention is used for metal hose designs that are subjected to high It is standard practice to place a "liner" inside the hose to reduce turbulence induced by the hose corrugations. The liner is usually fairly effective in reducing the turbulence in the hose.

However, there is still an area of reduction where the liner meets the hose end fitting. The end fitting has the pipe thread, flange, nipple, tube, etc. that attaches the hose to the equipment. This circumference at the junction of the liner to the end fitting is also subject to turbulence. This turbulence can result in excessive noise, reduced flow, or even catastrophic failure due to metal fatigue.

The present invention insert is designed and inserted into the reduced area and guides the gas flow past the area of potential turbulence. The insert can have straight sides or have a reduction in area (bell shaped). It can be machined into the end fitting, or installed with a flange between the end fitting and the liner, or be just an insert installed into the end fitting so that it is a an end fitting/liner insert.

It is an object of the present invention to provide a flanged metal insert and lead-in pipe with a tapered interior wall, that when used in combination, improves performance of the corrugated metal hose installed in high velocity gas or liquid applications. The use of a flanged insert protects the metal hose, the welds, and the interior metal liner from detrimental vibrations.

It is also an object of the present invention to incorporate a flanged metal insert which does include insertion of a non-bendable metal stainless steel flanged insert. Its length is roughly equal to the diameter of the corresponding internal diameter size of the hose; however, its length can be longer or shorter depending on the application requirements.

It is an additional object of the present invention to have the flow go from left to right as depicted in the drawings.

It is a further object of the present invention to provide a unique lead-in pipe, with a tapered interior wall that has an innovative design and is not conventional in traditional hose assemblies. It protects the metal weld where the hose and the liner are co-joined and creates a laminar flow with no flat edges.

It is still a further object of the present invention to provide an innovation which has the inclusion of a flanged metal insert and the lead-in machined pipe with a tapered interior wall co-joined to prevent abrasion of the liner, protection of the main hose to liner welds, and the ability to provide a smooth laminar flow to reduce turbulence.

It is a key object of the present invention that the welding of the flanged metal insert to the lead-in pipe with a tapered interior wall is part of the innovation.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
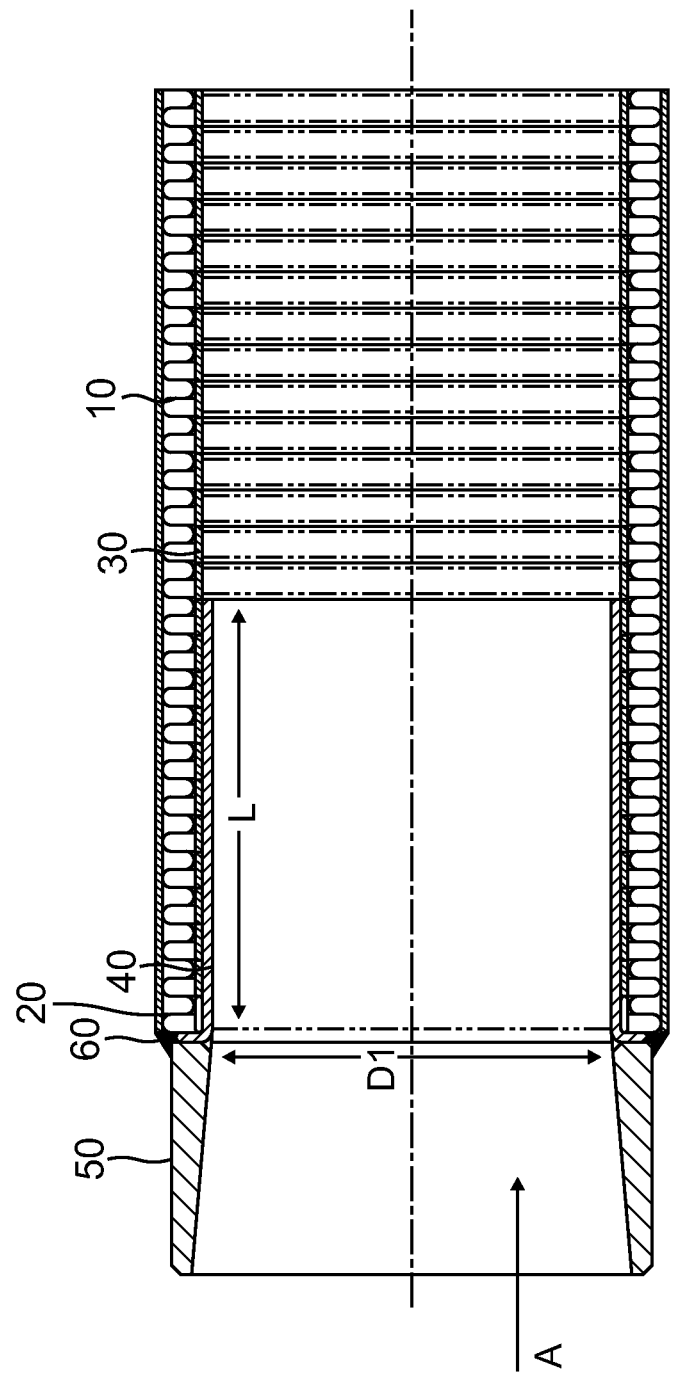
FIG. 1 is a side cross-sectional view of the present invention of a lead-in pipe with a tapered interior wall, a flanged metal insert, a corrugated hose, a braid surrounding the hose, an internal liner, and the lead-in tapered pipe affixed to the flanged metal insert.

Referring to the general concept of the present invention illustrated in FIG. 1 the present invention is a metal hose in cross-section 10 which is covered by a braid 20 which hose 10 in turn covers an interior liner 30 of the hose. The hose is used to conduct high velocity fluids and gases up to Mach 1. The invention has the following additional improvements:

1. The invention includes the insertion of a non-bendable stainless steel flanged insert. The insert is numbered 40. The insert is at the leading edge of the hose because the direction of gas travels in the direction of the arrow A. The length L of the non-bendable stainless steel flanged insert is roughly equal to the interior diameter D1 of the hose 10. However, its length can be longer or shorter depending up the application requirements.

2. The flow of gases is in the direction of the arrow A from left to right on the enclosed paper.

3. The lead-in pipe with a tapered interior wall 50 is machined to protect the weld 60 where the metal hose 10 and the liner 30 are co-joined and creates a laminar flow with no flat edges.

4. The innovation is the inclusion of the flanged metal insert 40 and the lead-in machined taper pipe 50 co-joined to prevent abrasion of the liner 30, protection of the main hose to line the welds and the ability to provide a smooth laminar flow to reduce turbulence.

5. The welding of the hose to the lead-in pipe with a tapered interior wall is part of the innovation.

Figure 2:
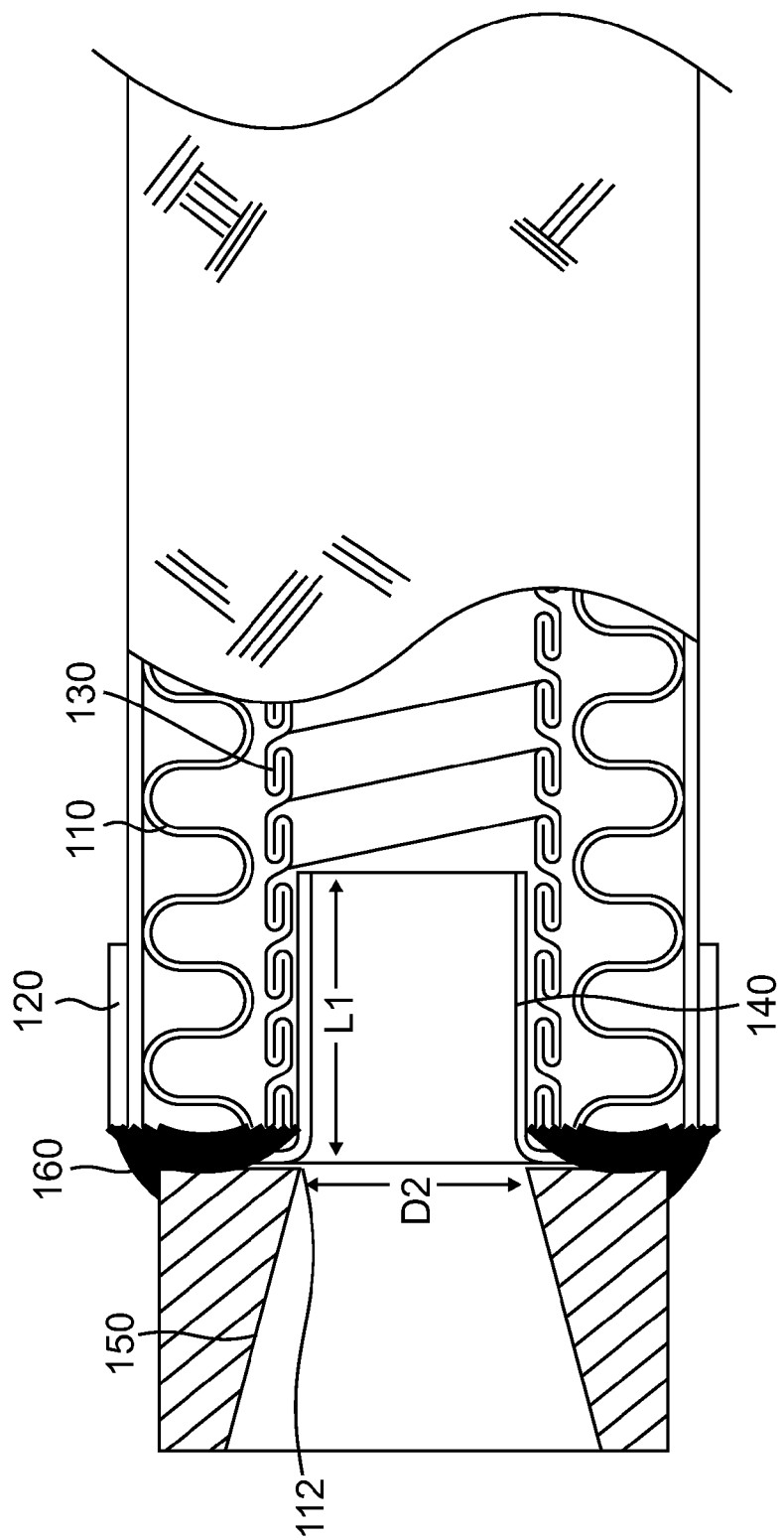
FIG. 2 is a side cross-sectional view of the general concept of the present invention as discussed above in the description of FIG. 1.

A more detailed drawing of the present invention is illustrated in FIG. 2. A hose 110 is traditionally a corrugated metal hose which is covered by a braid ring 120. The corrugated metal hose 110 covers an interior hose liner 130. The corrugated metal hose 110 hose is used to conduct high velocity fluids and gases up to Mach 1. The invention has the following additional improvements:

1. The invention includes the insertion of a non-bendable stainless steel flanged insert. The insert is numbered 140. The insert 140 is at the leading edge 112 of the corrugated metal hose 110 because the direction of gas travels in the direction of the arrow A. The length L1 of the non-bendable stainless steel flanged insert 140 is roughly equal to the interior diameter D2 of the corrugated metal hose 110. However, its length can be longer or shorter depending up the application requirements.

2. The flow of gases is in the direction of the arrow A from left to right as illustrated in FIG. 7.

3. The lead-in taper pipe with a tapered interior wall 150 is machined to protect the weld 160 where the corrugated metal hose 110 and the liner 130 are co-joined and creates a laminar flow with no flat edges.

4. The innovation is the inclusion of the flange metal insert 140 and the machined lead-in pipe with a tapered interior wall 150 co-joined to prevent abrasion of the liner 130, protection of the main hose to line the welds and the ability to provide a smooth laminar flow to reduce turbulence.

5. The welding of the corrugated metal hose 140 to the lead-in pipe with a tapered interior wall 150 is part of the innovation.

Figure 3:
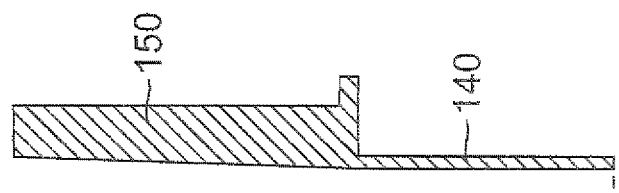
FIG. 3 is a cross-sectional view of a one-piece design for the present invention.
Figure 3:
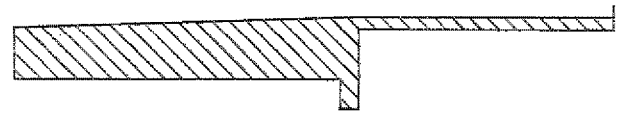

FIG. 3 illustrates a one-piece design for the flanged metal insert 140 and the lead-in pipe with a tapered interior wall 150.

Figure 4:
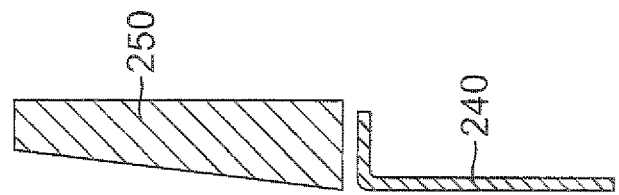
FIG. 4 is an alternative variation of a two-piece design for the present invention.
Figure 4:
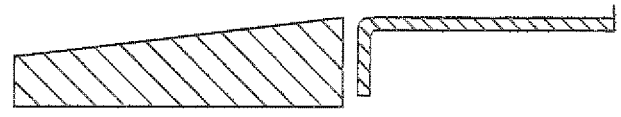

FIG. 4 illustrates a two-piece design where the lead-in tapered pipe with a tapered interior wall 250 and the flanged metal insert 240 are two separate pieces. This two-piece design can be used with the standard metal hose 10 illustrated in FIG. 1 or the corrugated metal hose design illustrated in FIG. 2.

Figure 5:
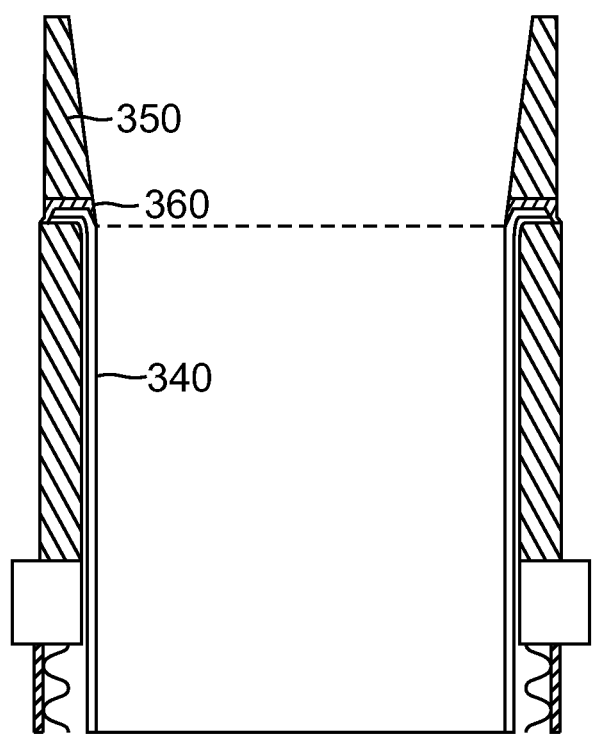
FIG. 5 is an alternative variation of a three-piece design for the present invention.

Referring to FIG. 5, a three-piece design utilizes a two-part lead-in pipe with a tapered interior wall 350 and 360 and a separate flanged metal insert 340. This three piece design can be used with the standard metal hose 10 illustrated in FIG. 1 or the corrugated metal hose design illustrated in FIG. 2.

The gas flow speeds used in the above designs can be up to Mach 1 or up to 1200 feet per second.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to enable a flow of high speed gases through the apparatus, the apparatus comprising:
   a. a corrugated metal hose covered by a braid, which corrugated metal hose in turn covers an interior liner of the corrugated metal hose;
   b. a non-bendable stainless steel flanged insert which is retained in the corrugated metal hose at a leading edge of the corrugated metal hose, a length of the non-bendable stainless steel flanged insert is approximately equal to an interior diameter of the corrugated metal hose;
   c. the braid, the corrugated metal hose, the interior liner of the corrugated metal hose flanged and the non-bendable stainless steel flanged insert each having a leading edge;
   d. a lead-in pipe having a straight exterior sidewall and a continuously inwardly tapering interior sidewall ending in an interior edge leading to an opening at a leading edge of the non-bendable stainless steel flanged insert;
   e. the leading edge of the lead-in pipe welded to the respective leading edge of the braid, the corrugated metal hose, the interior liner and the non-bendable stainless steel flanged insert; and
   f. the non-bendable stainless steel flanged insert and the lead-in pipe are made in two separate pieces;
   g. whereby, the interior edge of the lead-in pipe being concurrently welded to the leading edges of the braid, the corrugated metal hose, the liner and the non-bendable stainless steel flanged insert prevent abrasion of the interior liner and provide a smooth laminar flow and reduce turbulence to enable the conduction of high velocity fluids and gases up to Mach 1 through the apparatus.

2. An apparatus to enable a flow of high speed gases through the apparatus, the apparatus comprising:
   a. a corrugated metal hose covered by a braid, which corrugated metal hose in turn covers an interior liner of the corrugated metal hose;
   b. a non-bendable flanged insert which is retained in the corrugated metal hose at a leading edge of the corrugated metal hose, a length of the non-bendable flanged insert is approximately equal to an interior diameter of the corrugated metal hose;
   c. the braid, the corrugated metal hose, the interior liner of the corrugated metal hose and the non-bendable flanged insert each having a leading edge;
   d. a lead-in pipe having a straight exterior sidewall and a continuously inwardly tapering interior sidewall ending in an interior edge leading to an opening at a leading edge of the non-bendable flanged insert; and
   e. the leading edge of the lead-in pipe welded to the respective leading edge of the braid, the corrugated metal hose, the interior liner and the non-bendable flanged insert;
   f. whereby, the interior edge of the lead-in pipe being concurrently welded to the leading edges of the braid, the corrugated metal hose, the liner and the non-bendable flanged insert prevent abrasion of the interior liner and provide a smooth laminar flow and reduce turbulence to enable the conduction of high velocity fluids and gases up to Mach 1 through the apparatus.

3. The apparatus in accordance with claim 2, further comprising: the non-bendable flanged insert is made of stainless steel.

4. The apparatus in accordance with claim 2, further comprising: the non-bendable flanged insert and the lead-in pipe are made in two separate pieces.

5. An apparatus to enable a flow of high speed gases through the apparatus, the apparatus comprising:
   a. a corrugated metal hose covered by a braid, which corrugated metal hose in turn covers an interior liner of the corrugated metal hose;
   b. a flanged insert which is retained in the corrugated metal hose at a leading edge of the corrugated metal hose;
   c. the braid, the corrugated metal hose, the interior liner of the corrugated metal hose and the flanged insert each having a leading edge;
   d. a lead-in pipe having a straight exterior sidewall and a continuously inwardly tapering interior sidewall ending in an interior edge leading to an opening at a leading edge of the flanged insert; and
   e. the interior edge of the lead-in pipe welded to the respective leading edge of the braid, the corrugated metal pipe, the interior liner and the flanged insert;
   f. whereby, the interior edge of the lead-in pipe being concurrently welded to the leading edge of the braid, the corrugated metal hose, the liner and the flanged insert prevent abrasion of the interior liner and provide a smooth laminar flow and reduce turbulence to enable the conduction of high velocity fluids and gases up to Mach 1 through the corrugated apparatus.

6. The apparatus in accordance with claim 5, further comprising: the flanged insert is non-bendable.

7. The apparatus in accordance with claim 6, further comprising: the non-bendable flanged insert is made of stainless steel.

8. The apparatus in accordance with claim 5, further comprising: the flanged insert and the lead-in pipe are made in two separate pieces.

9. The apparatus in accordance with claim 5, further comprising: the length of the flanged insert is approximately equal to an interior diameter of the corrugated metal hose.

\* \* \* \* \*